US012663302B2

(12) United States Patent
Fischer et al.

(10) Patent No.: US 12,663,302 B2
(45) Date of Patent: Jun. 23, 2026

(54) APPARATUS, SYSTEM AND METHOD FOR DETERMINING AT LEAST TWO PROPERTIES OF A FLOWING MULTIPHASE FLUID

(71) Applicant: GLIMS Technology Ltd., Vancouver (CA)

(72) Inventors: Maxim Fischer, Saanichton (CA); Ross Waters, Vancouver (CA); Sheldon Jaffe, Richmond (CA)

(73) Assignee: GLIMS Technology Ltd., Vancouver (CA)

( * ) Notice: Subject to any disclaimer, the term of this patent is extended or adjusted under 35 U.S.C. 154(b) by 323 days.

(21) Appl. No.: 18/611,514

(22) Filed: Mar. 20, 2024

(65) Prior Publication Data

US 2025/0297877 A1     Sep. 25, 2025

(51) Int. Cl.
*G01F 1/74*          (2006.01)
*G01F 1/44*          (2006.01)
(52) U.S. Cl.
CPC . *G01F 1/74* (2013.01); *G01F 1/44* (2013.01)
(58) Field of Classification Search
None
See application file for complete search history.

(56) References Cited

U.S. PATENT DOCUMENTS

| | | | |
|---|---|---|---|
| 6,155,102 A | 12/2000 | Toma et al. | |
| 8,739,635 B2 * | 6/2014 | Bruno | G01F 1/44 |
| | | | 73/861.04 |
| 10,378,941 B2 * | 8/2019 | McCann | G01F 1/74 |
| 10,634,537 B2 | 4/2020 | Toma et al. | |
| 10,996,091 B2 * | 5/2021 | Meribout | G01F 1/712 |

FOREIGN PATENT DOCUMENTS

CN          117029945 A  * 11/2023   ............... G01F 1/86

* cited by examiner

*Primary Examiner* — Peter J Macchiarolo
*Assistant Examiner* — Jermaine L Jenkins
(74) *Attorney, Agent, or Firm* — Kirsten M. Oates; Rodman & Rodman LLP

(57)          ABSTRACT

An apparatus, system and method for use in determining at least two properties of a flowing multiphase fluid involves measuring pressure fluctuations caused by density variations of the multiphase fluid flowing by at least two monitoring devices positioned at distinct metering sections having different cross-sectional areas. The acquired signals are converted to root mean square voltage values which are inputs to equations derived from sensor feature maps. The equations are solved to determine mixture velocity and gas void fraction which are used to quantify volumetric gas and liquid flow rates of the multiphase fluid.

15 Claims, 8 Drawing Sheets

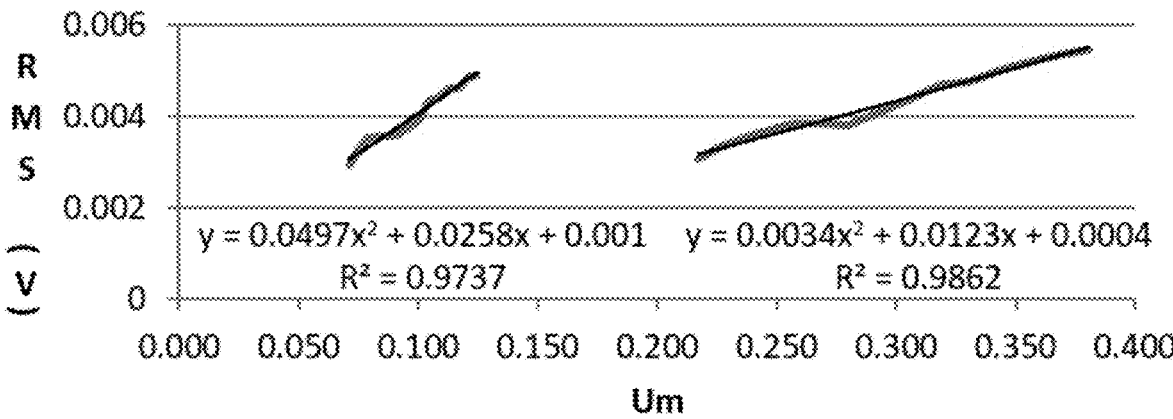

$y = 0.0497x^2 + 0.0258x + 0.001$    $y = 0.0034x^2 + 0.0123x + 0.0004$
$R^2 = 0.9737$                                $R^2 = 0.9862$

━━━RMS vs Um GVF=0.3 30mm venturi+mixer, U/S pipe sensor

━━━RMS vs Um, GVF=0.3, 30mm venturi+mixer, venturi sensor

──── Poly. (RMS vs Um GVF=0.3 30mm venturi+mixer, U/S pipe sensor)

──── Poly. (RMS vs Um, GVF=0.3, 30mm venturi+mixer, venturi sensor )

FIG. 10A

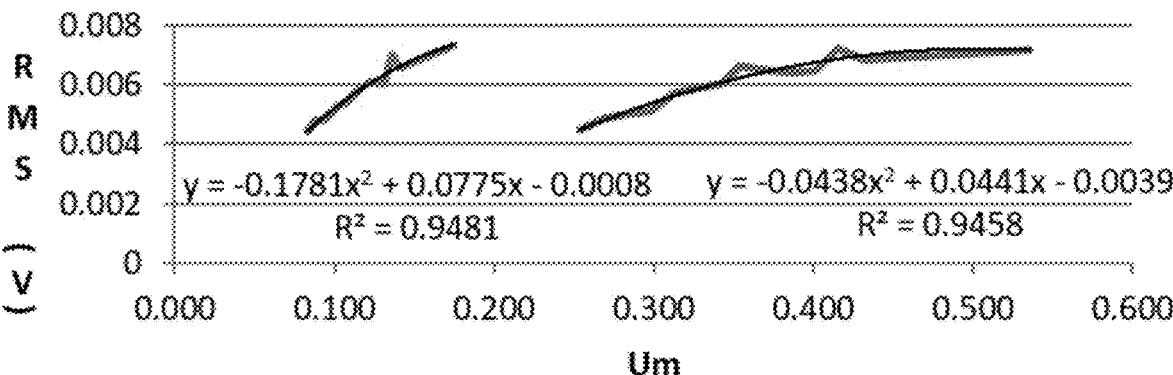

$y = -0.1781x^2 + 0.0775x - 0.0008$    $y = -0.0438x^2 + 0.0441x - 0.0039$
$R^2 = 0.9481$                                  $R^2 = 0.9458$

━━━RMS vs Um GVF=0.4, 30mm venturi+mixer, U/S pipe sensor

━━━RMS vs Um, GVF=0.4, 30mm venturi +mixer,venturi sensor

──── Poly. (RMS vs Um GVF=0.4, 30mm venturi+mixer, U/S pipe sensor)

──── Poly. (RMS vs Um, GVF=0.4, 30mm venturi +mixer,venturi sensor)

FIG. 10B

APPARATUS, SYSTEM AND METHOD FOR DETERMINING AT LEAST TWO PROPERTIES OF A FLOWING MULTIPHASE FLUID

TECHNICAL FIELD

The present invention relates to an apparatus, system and method for determining at least two properties of a flowing multiphase fluid.

BACKGROUND OF THE INVENTION

A multiphase fluid is a fluid having more than one phase, such as a fluid having two or more liquid phases or a combination of a gas phase with one or more liquid phases. Flowing multiphase fluids are frequently encountered in various scientific and industrial applications including boiling and condensation processes, aerosol flows in the environment, gas and petroleum flows, injection of water and gas mixtures into subterranean formations, gas-solid and slurry flows in pipelines, particle and fiber flows in airways, and fluidized bed reactors. It is often desirable to determine the flowing properties such as, for example, volumetric flow rates of individual phases.

The current method for measuring the total gas and liquid flow rates and phase ratios of a multiphase fluid involves using conventional single phase meters. Single phase meters cannot be used for measuring a multiphase fluid without separating its constituent phases (for example, gas, water, and oil which are initially co-mingled together during oil production processes). Flow structure greatly affects the accuracy of measurements performed by single phase meters when used in a multiphase application; therefore, the current method involves separating the phases using separator tanks and metering each phase using single phase meters. In the context of multiple production wells, each well is isolated from other wells and monitored for a set time using single phase meters positioned at the output of a test separator. However, this method does not provide real-time, continuous information on flow rates and phase ratios of produced oil, gas, and water originating from each well.

In contrast to single phase meters, multiphase flow meters eliminate the need for phase separation. Multiphase flow meters can measure the individual phase flow rates of constitute phases. Current multiphase flow meters employ various flow metering techniques for determining density, velocity, momentum, mass flow, and elemental analysis. While most techniques utilize gamma emission from a radioactive source, neutron absorption, pulse neutron activation, or radioactive tracers, radioactive materials may contaminate the environment and pose health safety concerns. Environmentally friendly techniques, such as impedance measurement, microwave attenuation, and acoustic attenuation, are highly sensitive to flow regimes and operate over limited phase ratios and velocities.

U.S. Pat. Nos. 10,274,354 and 10,634,537 to GLIMS Technology Ltd. (inventors Toma, Fischer, and Waters) describe determining at least two properties of a multiphase fluid using acceleration-related pressure drop fluctuations and probability density function (PDF). Data are collected by a single piezoelectric pressure sensor and two consecutive measurements are taken by altering the flow area with a movable flow diverter. However, the relationship used to determine mixture velocity and gas void fraction is prone to errors which adversely affect the results for liquid and volumetric gas flow rates. Accordingly, there is a need in the art for apparatuses, systems, and methods of mitigating these problems.

SUMMARY OF THE INVENTION

The present invention relates to an apparatus, system and method for use in determining at least two properties of a flowing multiphase fluid by measuring pressure fluctuations caused by density variations of the multiphase fluid flowing by at least two monitoring devices positioned at distinct metering sections having different cross-sectional areas. The acquired signals are converted to root mean square ("rms") voltage values which are inputs to equations derived from sensor feature maps. The equations are solved to determine mixture velocity and gas void fraction which are used to quantify volumetric gas and liquid flow rates of the multiphase fluid.

Multiphase flow is inhomogeneous. Bubble size/distribution within the liquid phase or droplet size/distribution within the gas phase is random and varies with the flow regime. The separated flow model considers slippage between the liquid and gas phases and assumes the phases have separated due to gravity leading to stratified flow in a horizontal meter. Such slippage is difficult to measure or quantify. Since the invention measures pressure fluctuations caused by density variations in a multiphase fluid, the monitoring devices do not detect anything in a stratified flow regime where the gaseous phase is in the top section of a horizontal pipe and no density variation occurs. To inhibit phase separation due to gravity, leading to stratified flow, vertical metering is used in the invention.

Further, a homogeneous flow model can be invoked as opposed to the separated flow model. To bring order and uniformity in such a wide variety of flow regimes and bubble size/distribution, the multiphase flow is temporarily preconditioned in a static mixer to yield a homogeneous mixture over a short spatial distance within the pipe so that at least two monitoring devices can measure the flowing properties of the multiphase flow. The monitoring devices can provide accurate information on phase content in two-phase flow if the composition within the field view of the monitoring devices is representative of that in the whole cross section of the measurement area. Homogeneity ensures that the monitoring devices' cones of vision in the metering flow area are exposed to two-phase mixtures representative of the composition in the entire metering area.

Thus, broadly stated, in one aspect of the invention, a method for determining at least two properties of a flowing multiphase fluid is provided, comprising:
  a) directing the multiphase fluid through an apparatus comprising:
    (i) an I-shaped body comprising an entrance for directing the multiphase fluid, and an exit for discharging the multiphase fluid therefrom;
    (ii) a static mixer positioned downstream of the entrance for mixing the multiphase fluid to yield a homogenous mixture;
    (iii) one or more venturi elements positioned downstream of the static mixer for receiving the homogenous mixture, and comprising first and second metering sections having different areas $A_1$ and $A_2$;
  b) monitoring the multiphase fluid with at least two monitoring devices in communication with the first and second metering sections to obtain at least two simultaneous signals representing at least two properties of the multiphase fluid;

c) converting the at least two signals into root mean square voltage values and comparing the root mean square voltage values with sensor feature maps having a format:

$$V_{RMS} = f(U_m, \alpha)$$

wherein $U_m$ denotes mixture velocity and a denotes gas void fraction;

d) correcting the root mean square values using a calibration curve to equalize responses of the monitoring devices;

e) establishing an equation set for each value of gas void fraction $\alpha$ belonging to a predetermined interval as follows:

$$i. \quad V_{RMS1} = f_1(U_{m1}, \alpha) \qquad \text{Eq. (26)}$$

$$ii. \quad V_{RMS2} = f_2(U_{m2}, \alpha) \qquad \text{Eq. (27)}$$

$$iii. \quad U_{m1} \cdot A_1 = U_{m2} \cdot A_2 \qquad \text{Eq. (9c)}$$

f) solving the equation set to obtain the mixture velocity and the gas void fraction;

g) using the mixture velocity and the gas void fraction to obtain volumetric gas flow rate $Q_G$ and liquid flow rate $Q_L$ using Equations 6 and 6a as follows:

$$Q_G = U_m \cdot \alpha \cdot A \qquad \text{Eq. (6)}$$

$$Q_L = U_m \cdot (1 - \alpha) \cdot A \qquad \text{Eq. (6a)}$$

and h) repeating steps a) through g) to update the volumetric gas flow rate and the liquid flow rate on a continuous basis.

In another aspect of the invention, a system for use in determining at least two properties of a flowing multiphase fluid is provided, comprising:

(a) an apparatus comprising:

(i) an I-shaped body comprising an entrance for directing the multiphase fluid, and an exit for discharging the multiphase fluid therefrom;

(ii) a static mixer positioned downstream of the entrance for mixing the multiphase fluid to yield a homogenous mixture;

(iii) one or more venturi elements positioned downstream of the static mixer for receiving the homogenous mixture, and comprising first and second metering sections having different areas;

(iv) at least two monitoring devices mounted in fluid communication at the first and second metering sections for monitoring one or more properties of the homogenous mixture flowing therethrough; and (b) a controller communicatively coupled to the monitoring devices for calculating the one or more properties of the multiphase fluid from at least two simultaneous signals received from the monitoring devices.

In another aspect of the invention, an apparatus for use in determining at least two properties of a flowing multiphase fluid is provided, comprising:

(i) an I-shaped body comprising an entrance for directing the multiphase fluid, and an exit for discharging the multiphase fluid therefrom;

(ii) a static mixer positioned downstream of the entrance for mixing the multiphase fluid to yield a homogenous mixture;

(iii) one or more venturi elements positioned downstream of the static mixer for receiving the homogenous mixture, and comprising first and second metering sections having different areas;

(iv) at least two monitoring devices mounted in fluid communication at the first and second metering sections for monitoring one or more properties of the homogenous mixture flowing therethrough;

wherein the apparatus is capable of being communicatively coupled to a controller for calculating the one or more properties of the multiphase fluid from at least two simultaneous signals received from the monitoring devices.

In yet another aspect of the invention, a non-transitory computer-readable medium is provided which stores instructions that, when executed by a processor, causes the processor to:

a) receive signals representing at least two properties of a flowing multiphase fluid from at least two monitoring devices;

b) convert the signals into root mean square voltage values and compare the root mean square voltage values with sensor feature maps having a format:

$$V_{RMS} = f(U_m, \alpha)$$

wherein $U_m$ denotes mixture velocity and a denotes gas void fraction;

c) correcting the root mean square values using a calibration curve to equalize responses of the monitoring devices;

d) establish an equation set for each value of gas void fraction $\alpha$ belonging to a predetermined interval as follows:

$$i. \quad V_{RMS1} = f_1(U_{m1}, \alpha) \qquad \text{Eq. (26)}$$

$$ii. \quad V_{RMS2} = f_2(U_{m2}, \alpha) \qquad \text{Eq. (27)}$$

$$iii. \quad U_{m1} \cdot A_1 = U_{m2} \cdot A_2 \qquad \text{Eq. (9c)}$$

e) solve the equation set to obtain the mixture velocity and the gas void fraction;

f) use the mixture velocity and the gas void fraction to obtain volumetric gas flow rate $Q_G$ and liquid flow rate $Q_L$ using Equations 6 and 6a as follows:

$$Q_G = U_m \cdot \alpha \cdot A \qquad \text{Eq. (6)}$$

$$Q_L = U_m \cdot (1 - \alpha) \cdot A \qquad \text{Eq. (6a)}$$

and g) repeat steps a) through f) to update the volumetric gas flow rate and liquid flow rate on a continuous basis.

Additional aspects and advantages of the present invention will be apparent in view of the description which follows. It should be understood, however, that the detailed description and the specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Embodiments of the invention will now be described with reference to the accompanying drawings, in which:

FIG. 10A is a graph showing actual operational characteristics related to the system of FIG. 4 for gas void fraction $\alpha=0.3$.

FIG. 10B is a graph showing actual operational characteristics related to the system of FIG. 4 for gas void fraction $\alpha=0.4$.

DETAILED DESCRIPTION OF PREFERRED EMBODIMENTS

The present invention relates to an apparatus, system, and method for use in determining at least two properties of a flowing multiphase fluid. Preferably, the multiphase fluid includes a gas phase and at least one liquid phase. Most preferably, the multiphase fluid is a two phase fluid comprising a gas phase and a liquid phase, where either phase may be the continuous phase or the dispersed phase.

The invention determines at least two properties of a flowing multiphase fluid by measuring pressure fluctuations caused by density variations of the multiphase fluid flowing by at least two monitoring devices positioned at distinct metering sections having different cross-sectional areas. The acquired signals are converted to root-mean-square ("rms")

voltage values which are inputs to equations derived from sensor feature maps. The equations are solved to determine mixture velocity and gas void fraction which are used to quantify volumetric gas and liquid flow rates of the multiphase fluid.

Figure 1:
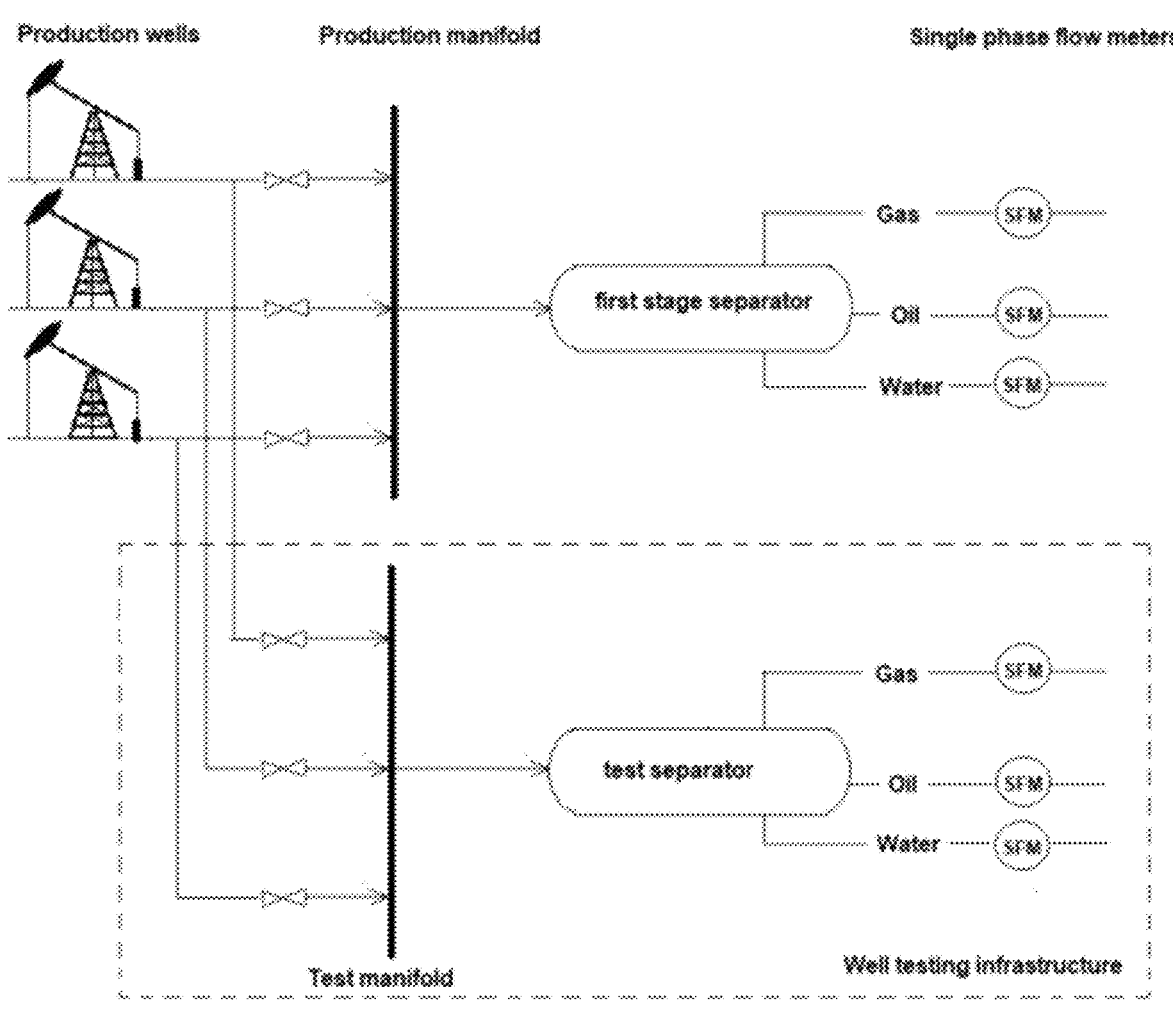
FIG. 1 (PRIOR ART) is a schematic view of a prior art well testing layout.

As shown in FIG. 1 (PRIOR ART), the current method for measuring the total gas and liquid flow rates and phase ratios of a multiphase fluid requires separating the phases using separator tanks and metering each phase using single phase meters. Each well is isolated from other wells and monitored for a set time using single phase meters positioned at the output of a test separator. However, this method does not provide real-time, continuous information on flow rates and phase ratios of produced oil, gas, and water originating from each well.

Figure 2:
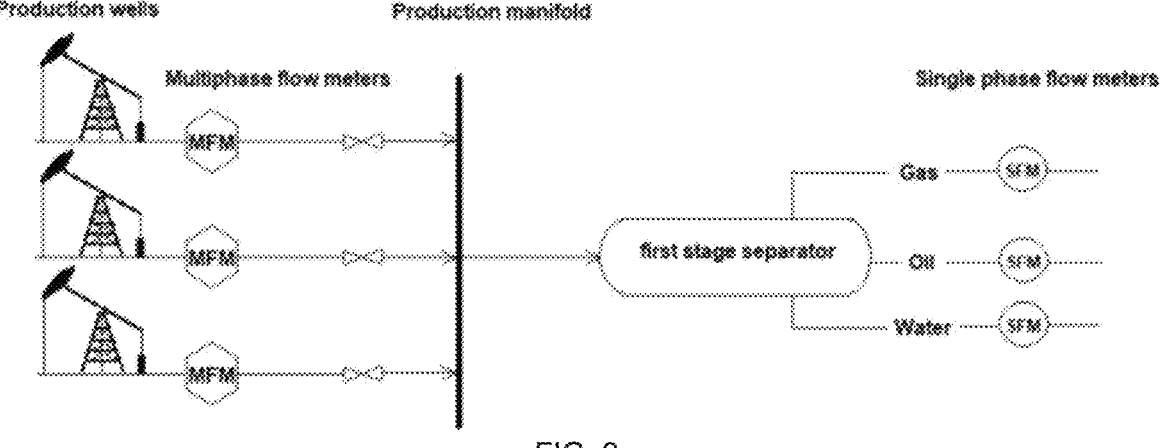
FIG. 2 is a schematic view of an exemplary use of the invention for reservoir management and well production allocation in real time.

In contrast, the present invention provides continuous, online, real time well production and monitoring for each well (FIG. 2). The invention eliminates the need for conventional test separators, portable test units, and well test pipelines, thereby minimizing expenses for equipment, operation, and maintenance. It should be apparent, however, to those skilled in the art that applications other than reservoir management are included within the scope of the invention. The invention will now be described having reference to the accompanying Figures.

Apparatus and System

Figure 3:
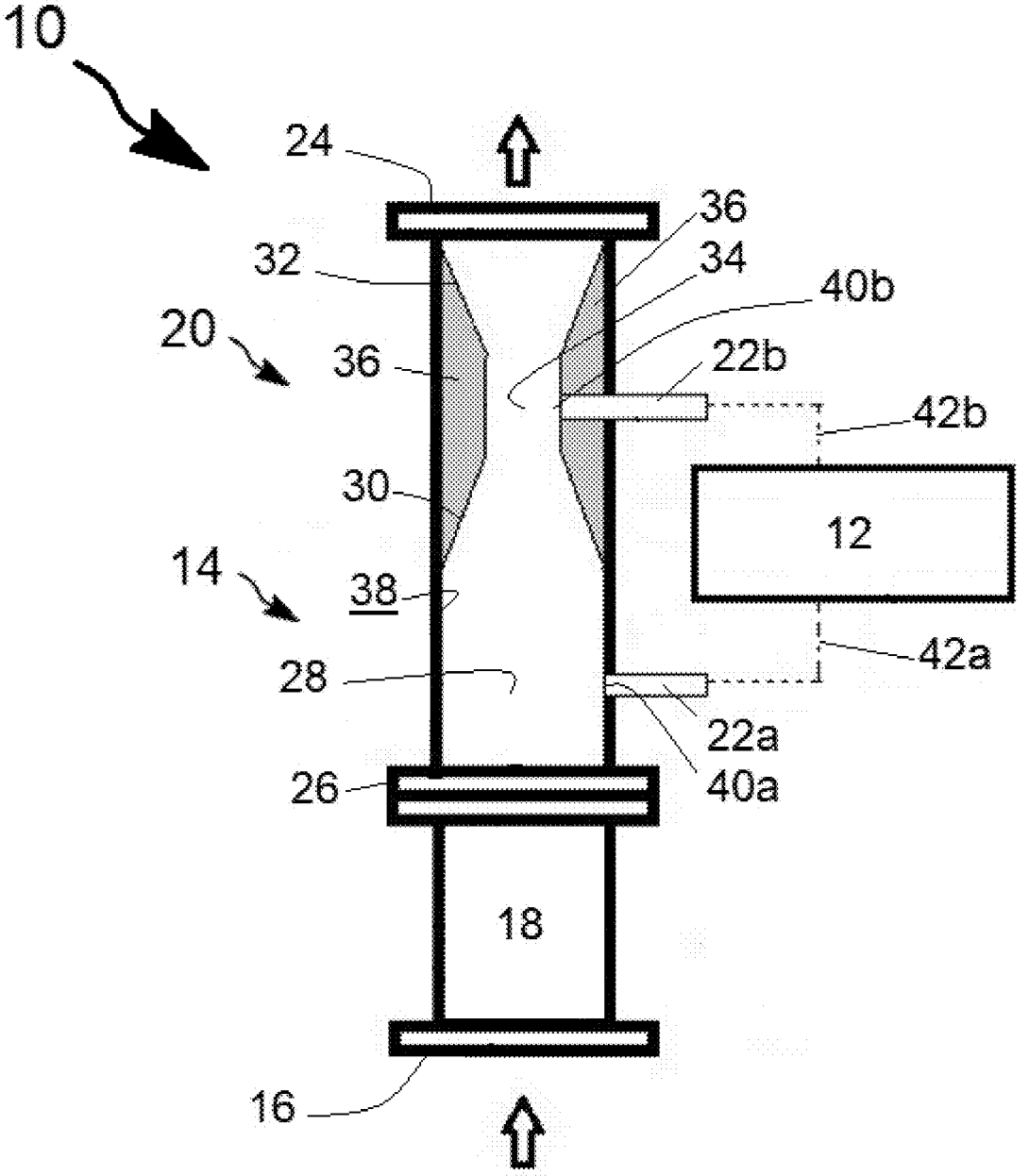
FIG. 3 is a schematic view of a first embodiment of a system for measuring the gas and liquid flow rates of a multiphase fluid.
Figure 4:
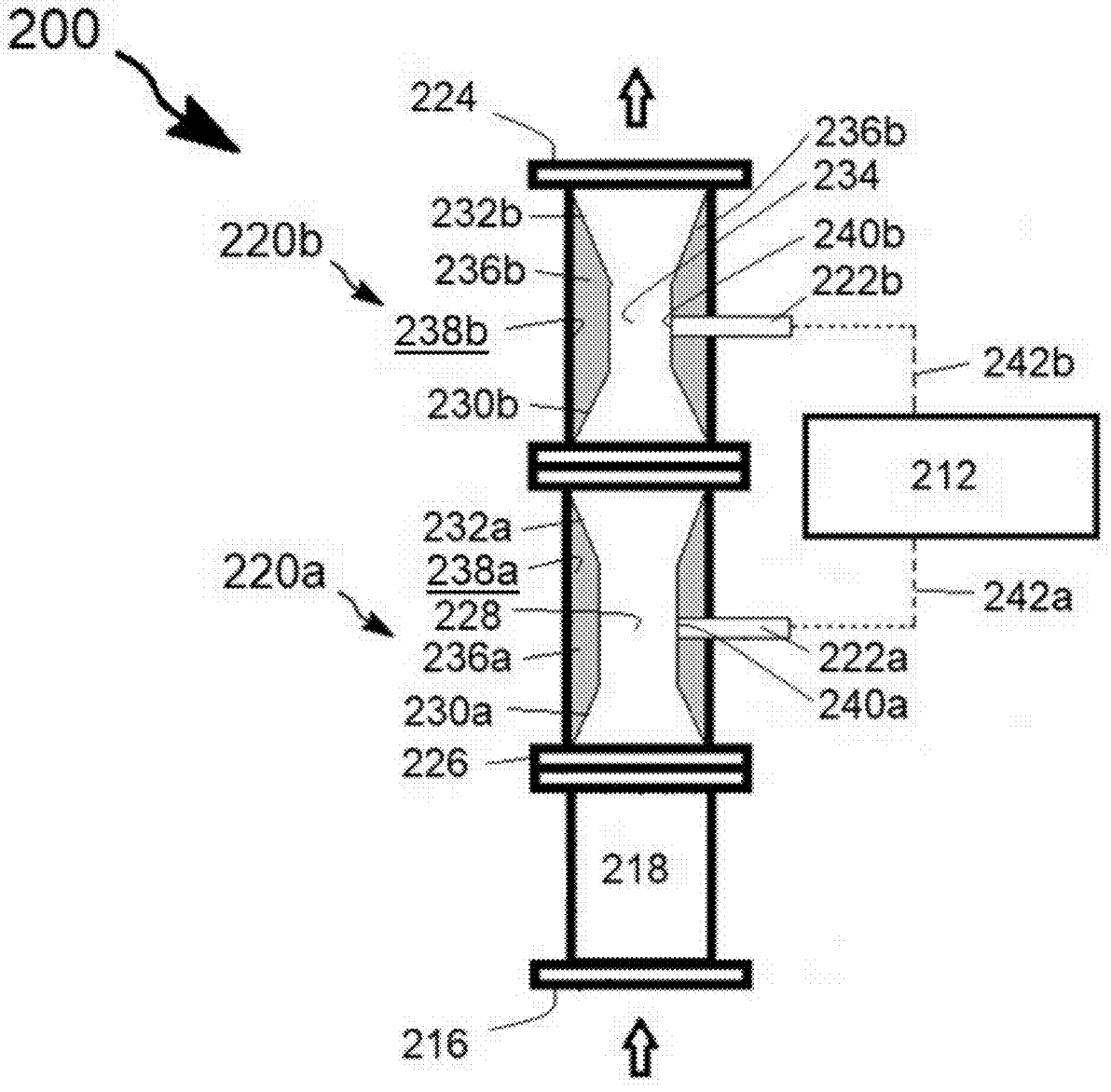
FIG. 4 is a schematic view of a second embodiment of a system for measuring the gas and liquid flow rates of a multiphase fluid.

Referring to FIGS. 3-4, the system form of the invention includes an apparatus (10) and a controller (12) comprising data acquisition, storage, and processing modules which intercommunicate to perform selected functions.

A first embodiment of the apparatus (10) which can be used in the present invention is shown generally in FIG. 3 to include a body (14) comprising an entrance (16), a static mixer (18), a venturi element (20), at least a pair of monitoring devices (22a, 22b), and an exit (24). The static mixer (18) and the venturi element (20) together define a fluid flow path through the body (14) connecting the entrance (16) and the exit (24).

The body (14) allows the multiphase fluid (indicated by vertical arrows) to flow from a transport line (not shown) into the entrance (16), through the static mixer (18) and the venturi element (20), and out the exit (24) to return into the transport line (not shown). In some embodiments, each of the entrance (16) and exit (24) has an inner diameter which is the same or approximates the inner diameter of the transport line (not shown) from which the multiphase fluid enters the apparatus (10) through the entrance (16), and into which the multiphase fluid is discharged from the apparatus (10) through the exit (24).

In some embodiments, the body (14) is substantially I-shaped. By having an I-shaped cross-section, the multiphase fluid is directed to flow vertically into the entrance (16), through the static mixer (18) and the venturi element (20), and is discharged vertically through the exit (24). In some embodiments, the body (14) comprises a generally tubular housing.

The static mixer (18) is positioned downstream of the entrance (16). Static mixers for use in the treatment of fluids flowing in pipes are well known to those skilled in the art, and are characterized in that they lack moving parts, will not induce excessive pressure drops in the multiphase fluid flowing therethrough, and will induce homogenization of the multiphase fluid. Static mixers generally comprise mixing elements (for example, baffles, vanes, and the like) which may have planar or curved surfaces, variously arranged and angled to the flow direction, and appropriate for dividing the multiphase fluid into individual streams and recombining the individual streams to yield a homogenous mixture. As used herein, the term "homogenous" refers to a gas and liquid as well as to two liquids (e.g., gas and oil; air and water, or oil and water only) behaving almost as a single, well-mixed phase. A homogenous mixture is desirable to avoid slippage which occurs in a non-homogenous mixture due to the gas phase slipping through the liquid phase due to the large specific gravity difference between the phases, and to ensure that the velocities of the phases are equal. Suitable static mixers include, but are not limited to, any commercially available static mixer or those as described for example, in U.S. Pat. Nos. 4,123,178 and 4,824,614. The multiphase fluid flows through the static mixer (18) to yield a homogenous mixture which is discharged through the output (26) of the static mixer (18) into the venturi element (20).

The venturi element (20) is positioned downstream of the static mixer (16) to receive and allow the flow of the homogenous mixture therethrough. In some embodiments as shown in FIG. 3, the venturi element (20) comprises a first metering section (28) positioned downstream of the output (26) of the static mixer (18) and comprising a first area (designated as "$A_1$") at which one or more properties of the homogenous mixture are measured.

Following the first metering section (28), the venturi element (20) further comprises a converging inlet (30) and a diverging outlet (32) at the opposite ends thereof, and a throat or second metering section (34) positioned between the converging inlet (30) and the diverging outlet (32). The second metering section (34) comprises a second area (designated as "$A_2$") at which one or more properties of the homogenous mixture are measured. In some embodiments, the venturi element (20) is formed by a double-tapered insert (36) which is attached to the inner surface (38) of the body (14). In some embodiments, the entire venturi section is machined. In some embodiments, the first area $A_1$ of the first metering section (28) differs from the second area $A_2$ of the second metering section (34); i.e., $A_1 \neq A_2$. In some embodiments, the first area $A_1$ of the first metering section (28) is greater than the second area $A_2$ of the second metering section (34). In some embodiments, the first metering section (28) has a width greater than the width of the second metering section (34) as viewed in cross-section.

A second embodiment of the apparatus (200) which can be used in the present invention is shown generally in FIG. 4 to include the same features as the first embodiment of the apparatus (10), with the exception that the second embodiment of the apparatus (200) has more than one venturi element (20) positioned in series. The same features include a body (214), entrance (216), static mixer (218) including an output (226), and exit (224). In some embodiments, the apparatus (200) includes a pair of venturi elements (220a, 220b).

In some embodiments, the apparatus (200) includes a first venturi element (220a) positioned downstream from the static mixer (218) to receive and allow the flow of the homogenous mixture therethrough. The first venturi element (220a) comprises a converging inlet (230a) and a diverging outlet (232a) at the opposite ends thereof, and a throat or first metering section (228) positioned between the converging inlet (230a) and the diverging outlet (232a). The first metering section (228) comprises a first area (designated as "$A_1$") at which one or more properties of the homogenous mixture are measured. In some embodiments, the first venturi element (220a) is formed by a double-tapered insert (236a)

which is attached to the inner surface (238a). In some embodiments, the entire venturi section is machined.

In some embodiments, a second venturi element (220b) is positioned downstream from the first venturi element (220a). The second venturi element (220b) comprises a converging inlet (230b) and a diverging outlet (232b) at the opposite ends thereof, and a throat or second metering section (234) positioned between the converging inlet (230b) and the diverging outlet (232b). The second metering section (234) comprises a second area (designated as "$A_2$") at which one or more properties of the homogenous mixture are measured. In some embodiments, the second venturi element (220b) is formed by a double-tapered insert (236b) which is attached to the inner surface (238b). In some embodiments, the entire venturi section is machined.

In some embodiments, the first area $A_1$ of the first metering section (228) differs from the second area $A_2$ of the second metering section (234); i.e., $A_1 \neq A_2$. In some embodiments, the first area $A_1$ of the first metering section (228) is greater than the second area $A_2$ of the second metering section (234). In some embodiments, the first metering section (228) has a width greater than the width of the second metering section (234) as viewed in cross-section.

In the first embodiment of the apparatus (10), the homogenous mixture maintains its homogeneity as it exits the output (26) of the static mixer (18) and flows in turn through the venturi element (20) towards the exit (24). Similarly, in the second embodiment of the apparatus (200), the homogenous mixture maintains its homogeneity as it exits the output (226) of the static mixer (218) and flows in turn through the first venturi element (220a) and the second venturi element (220b) towards the exit (224). However, in both embodiments, the homogenous mixture loses its homogeneity as it is discharged through the exit (24, 224). The bubbles or droplets within the homogenous mixture coalesce, restoring the multiphase fluid into a non-homogenous two-phase fluid (i.e., its original flow structure before entry into the static mixer (18, 218)).

In both embodiments of the apparatus (10, 200), monitoring devices (22a, 22b, 222a, 222b) are mounted in fluid communication (i.e., in contact with the fluid) at measurement points for monitoring properties of the flowing homogenous mixture. In the first embodiment, the measurement points comprise the first metering section (28) and the second metering section (34) of the venturi element (20). In the second embodiment, the measurement points comprise the first metering section (228) of the first venturi element (220a), and the second metering section (234) of the second venturi element (220b).

The monitoring devices (22a, 22b, 222a, 222b) do not impede the flow of the homogenous mixture. The monitoring devices (22a, 22b, 222a, 222b) are coupled to corresponding ports (40a, 40b, 240a, 240b) provided at the measurement points, mounted flush with the interior of the pipe to enable contact with the homogenous mixture. The ports (40a, 40b, 240a, 240b) are oriented at about 90° relative to the entrance (16, 216) and the exit (24, 224) axis.

Figure 5:
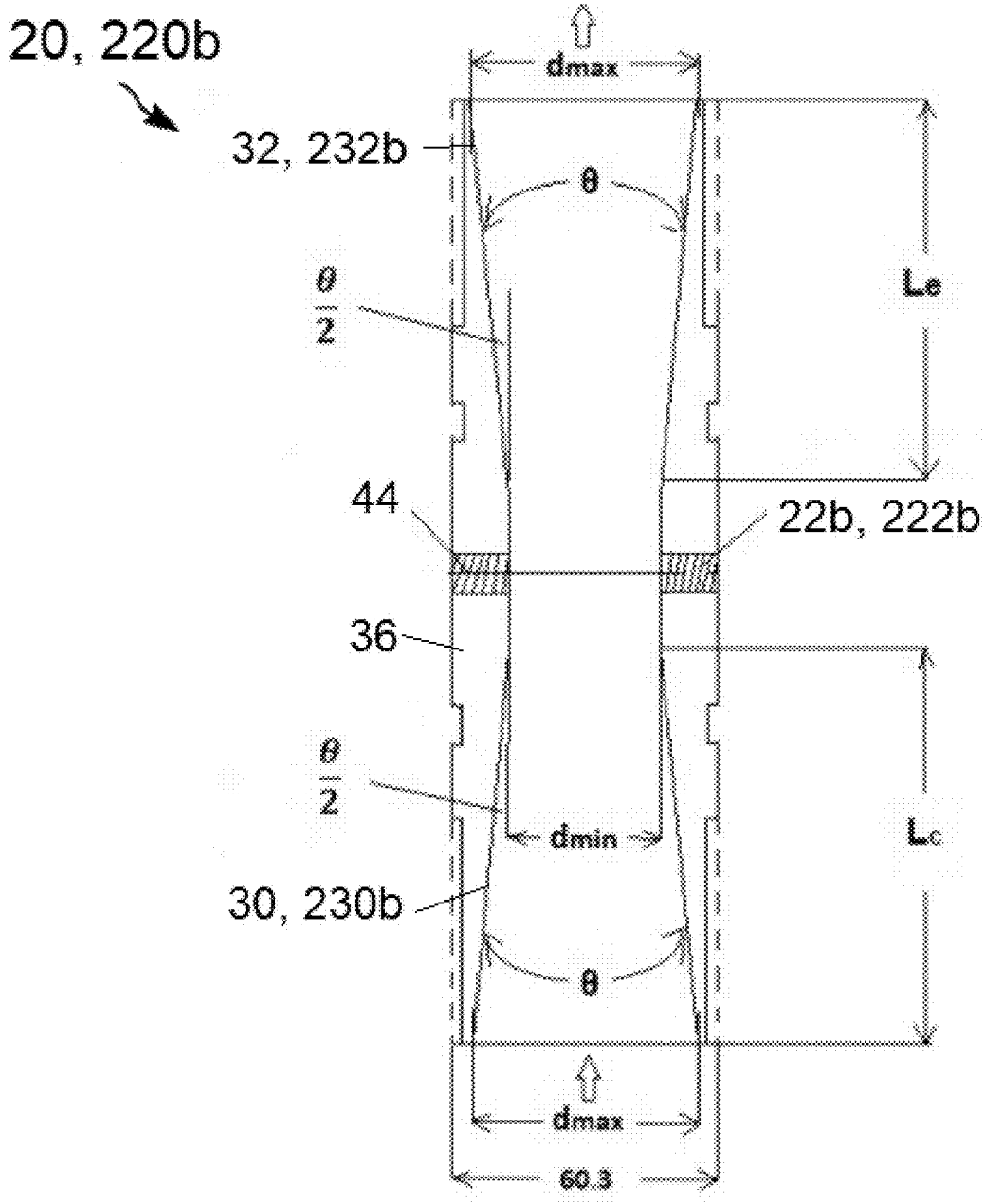
FIG. 5 is a schematic view showing geometrical details of the contraction/expansion model.

By temporarily positioning the first monitoring device (22a, 222a) at the second metering section (34, 234), the monitoring devices (22a, 22b, 222a, 222b) are factory calibrated during assembly of the apparatus (10, 200) to ensure that they exhibit identical sensitivity and provide an identical response upon exposure to the same homogenous mixture. As shown in FIG. 5, a calibration port (44) extends through an insert (36) of the venturi (20, 220b) to allow the mounting of the first monitoring device (22a, 222a) temporarily to monitor the same measurement flowing area as (22b, 222b) which mounts on the opposite side. As both monitoring devices (22a, 22b, 222a, 222b) are exposed to the same homogenous mixture, any difference in their sensitivities can be identified. As the signals detected by the monitoring devices (22a, 22b, 222a, 222b) must be equal, either a gain may be determined and applied to the less sensitive monitoring device, thus making the responses equal. Alternatively, attenuation may be determined and applied to the more sensitive monitoring device, thus making the responses equal. A calibration curve can be generated to even out the response of the monitoring devices (22a, 22b, 222a, 222b), and is stored in the controller (12, 212) for use to apply any correction necessary to equalize the response of the monitoring devices (22a, 22b, 222a, 222b). Once the monitoring devices (22a, 22b, 222a, 222b) have been equalized, the first monitoring device (22a, 222a) can be mounted into its permanent location.

The monitoring devices (22a, 22b, 220a, 222b) comprise piezoelectric pressure sensors which convert pressure fluctuations into electrical signals, and are communicatively coupled to the controller (12, 212) by respective communication lines (42a, 42b, 242a, 242b). As used herein, the term "communicatively coupled" is intended to mean either a direct or an indirect communication connection. Such connection may be a wired or wireless connection which is well known to those skilled in the art and will therefore not be discussed in detail. Each monitoring device (22a, 22b, 220a, 222b) detects a parameter of interest and generates signals representative of the parameter in continuous real time. The signals are then transmitted to the controller (12, 212) for storing, processing, and analysis.

Figure 9:
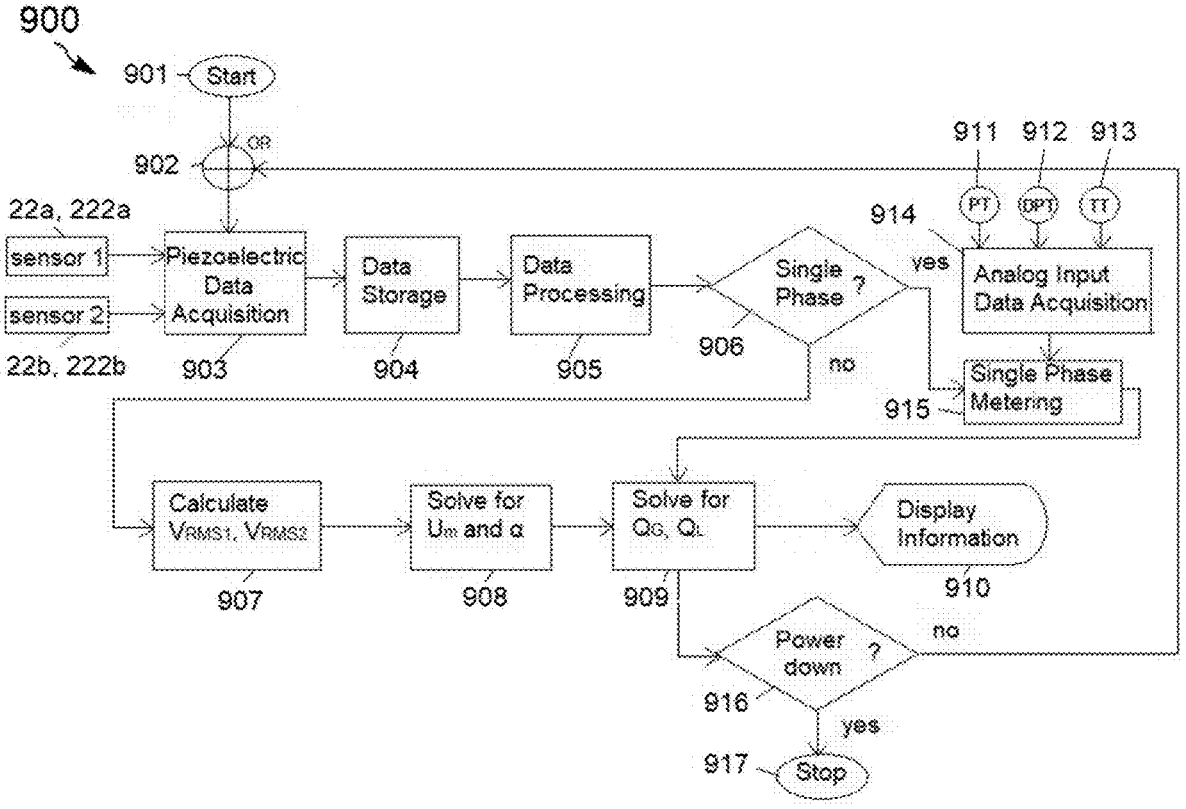
FIG. 9 is a flowchart showing an exemplary method for determining at least two properties of a flowing multiphase fluid.

The controller (12, 212) may include any instrumentality or aggregate of instrumentalities operable to compute, classify, process, transmit, receive, retrieve, originate, switch, store, display, detect, record, handle, or utilize any form of information or data. For example, the controller (12, 212) may be any suitable computer-system configuration, including hand-held devices, multiprocessor systems, microprocessor-based or programmable-consumer electronics, minicomputers, mainframe computers, and the like. Any number of computer-systems and computer networks are acceptable for use with the present invention, provided they are installed in the hazardous area classification for which they are certified. The invention may be practiced in distributed-computing environments where tasks are performed by remote-processing devices that are linked through a communications network. In a distributed-computing environment, program modules may be located in both local and remote computer-storage media including memory storage devices. The present invention may be implemented in connection with various hardware, software or a combination thereof, in a computer system or other processing system. The controller (12, 212) or computing unit may include a memory, computer-readable media comprising computer storage media, application programs, a user interface, a video interface, and a processing unit. Although many other components of the controller (12, 212) are not described, those skilled in the art will appreciate that such components and their interconnection are well known. The memory primarily stores the application programs or program modules containing computer-executable instructions which are executed by the controller (12, 212) for implementing the described functions. The memory includes for example, the data acquisition, storage, processing, and single phase metering modules (FIG. 9).

Calculations and Equations

The passage of the multiphase fluid through the metering sections (28, 34, 228, 234) produces relatively small pressure fluctuations ($\Delta P$) whose amplitudes depend on local density variations ($\Delta\rho_m$) and mixture velocities ($U_m$) in the metering sections (28, 34, 228, 234). It is assumed that velocity does not change in time in the metering sections (28, 34, 228, 234), i.e.

$$\frac{\partial U_m}{\partial t} = 0$$

for the duration of one measurement, thus providing a steady flow. However, velocity in the pipe changes with space, i.e.

$$\frac{\partial U_m}{\partial s} \neq 0$$

due to the converging and diverging geometry of the apparatus (10, 200), thus producing a non-uniform flow. Areas of the metering sections (28, 34, 228, 234) are fixed, and velocities attain magnitudes related to each other by the equality expressed by Eq. 9(c) where the area $A_1$ of the first metering section (28, 228) and the area $A_2$ of the second metering section (34, 234) are known quantities. The monitoring devices (herein for example, piezoelectric sensors) (22a, 22b, 222a, 222b) measure transient dynamic events, repetitive or random, such as pressure fluctuations that are superimposed on high static pressures. The sensors are insensitive to and do not measure static pressure.

Although they incorporate acceleration-compensation, the sensors (22a, 22b, 222a, 222b) have residual acceleration sensitivity which may interfere with the pressure fluctuation measurement, and may pick up pipe vibrations which may contaminate the pressure fluctuation signal. The pressure fluctuations measured by the sensors (22a, 22b, 222a, 222b) are variations of pressure due to elevation head of the form $P=\rho \cdot g \cdot H$, variations of pressure due to kinetic head of the form $P=\rho \cdot U^2/2$, and variations of pressure due to convective accelerations of the form $P=\rho \cdot U \cdot \Delta U$ which are associated with velocity changes along a streamline. Such velocity changes with space ($\Delta U$) are caused by changes in the flowing area with position and occur because of changes in position in the flow field just ahead of the metering sections (34, 228, 234). Such pressure fluctuations are caused by density variations of the two-phase fluid in motion, and defined as:

$$\Delta P = \Delta\rho_m \cdot g \cdot H + \Delta\rho_m \cdot U_m \cdot \Delta U_m + \Delta\rho_m \cdot \frac{U_m^2}{2} \qquad \text{Eq. (1)}$$

giving voltage pulses:

$$\Delta V = \Delta P \cdot S_{sensor} \qquad \text{Eq. (2)}$$

wherein:
the symbol $\Delta$ indicates change,
$\Delta\rho_m$ is the local density variation of the flowing composite gas-liquid fluid expressed in $Kg/m^3$,
$g=9.81$ m/s$^2$ acceleration due to gravity,
H length of vertical section of conduit above sensor location, expressed in meters,
$U_m$ local mixture velocity in the metering area expressed in m/s,

11

$\Delta U_m$ velocity changes with respect to space between two metering locations, $\Delta P$ is the local pressure fluctuation expressed in Pa, $S_{sensor}$ is the sensitivity of the pressure sensor expressed in mV/Pa, $\Delta V$ local voltage fluctuations or pulses recorded by controller expressed in mV.

As used herein, "local" refers to a variable value in the metering sections (28, 34, 228, 234) as opposed to local acceleration occurring when velocity changes with respect to time at a given point. To reiterate, it is assumed that velocity does not change with respect to time during the sample acquisition time t. There are only convective accelerations defined as changes of velocity with respect to space. These voltage fluctuations representing pressure fluctuations, due to convective acceleration, elevation head and kinetic head, are sampled at a rate of 51.2 KS/sec (kilo samples/sec) for a predetermined time, t seconds, thus providing a known number of instantaneous voltage instances n=51,200·t of various amplitudes. All voltage samples of same amplitude are stored in holding bins allocated to that amplitude. The time-varying voltage signal is thus digitized in a histogram consisting of a number of holding bins (e.g., 1000 bins).

Figure 6A:
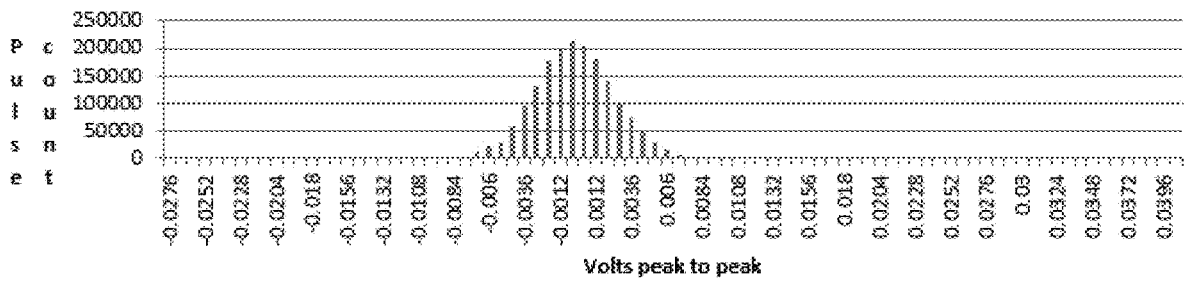
FIG. 6A is a histogram collected for gas void fraction $\alpha=0.2$, $Q_L=1.7$ CMH, $U_m=0.113$.
Figure 6B:
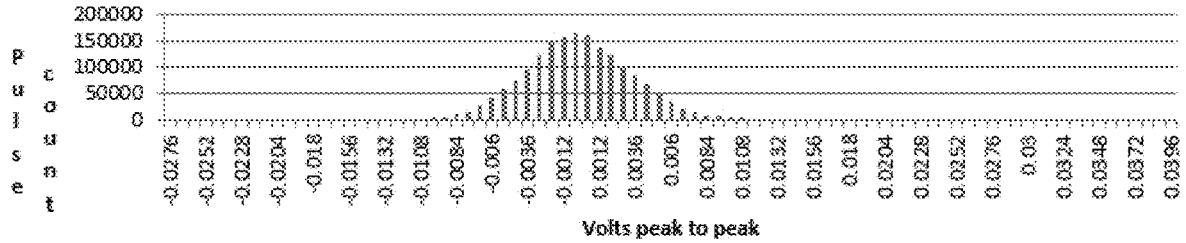
FIG. 6B is a histogram collected for gas void fraction $\alpha=0.3$, $Q_L=1.7$ CMH, $U_m=0.129$.

Each bin contains the number of times the instantaneous voltage sample had the respective amplitude associated with that bin. The minimum and maximum voltage amplitudes are set to ±0.4V, giving a resolution of 0.8V/1000-0.8 mV between adjacent holding bins. Histograms recorded by one sensor (22b, 222b) are shown in FIGS. 6A-B for different gas void fractions and mixture velocities.

To be noted on the histograms is that the flow rates of the individual phases are dependent on the gas void fraction $\alpha$ and mixture velocity $U_m$ as the number of collected voltage pulses of same amplitude deposited in each bin is different under the two scenarios. This is a visual representation as to how $V_{RMS}=f(U_m, \alpha)$; the rms voltage is computed from each histogram using the pulse count of every bin and the voltage associated with that bin (see Eq. (5)).

The mixture density of a two phase gas-liquid fluid mixture is defined as:

$$\rho_m = \alpha \cdot \rho_G + (1 - \alpha) \cdot \rho_L \qquad \text{Eq. (3)}$$

and mixture density variation $\Delta \rho_m$ is defined as:

$$\rho_m = \Delta \alpha \cdot \rho_G + (1 - \Delta \alpha) \cdot \rho_L \qquad \text{Eq. (3a)}$$

wherein $\rho_G$ and $\rho_L$ are the gas and liquid densities, and $\alpha$ is the gas void fraction and $\Delta \alpha$ gas void fraction variations. The gas void fraction is defined as the ratio:

$$\alpha = \frac{A_G}{A} \qquad \text{Eq. (4)}$$

wherein $A_G$ is the sum of the cross-sectional areas occupied by gas bubbles and A is the entire cross-sectional flow area in the metering plane where the monitoring device is located. The instantaneous gas void fraction varies from one moment to the next as the area $A_G$ occupied by the gas bubbles in the metering section varies from one moment to the next due to the gas bubble distribution, bubble size and bubble shape of the upward two-phase fluid flowing through the apparatus (10, 200). Although the two-phase mixture is homogeneous due to the static mixer (18, 218), expanding or collapsing gas bubbles, deformation of potentially incipient developing slugs, and deviation of bubble trajectory due to turbulent flow may be encountered, leading to instantaneous fluctuations in the area occupied by the gas bubbles. In other words:

$$\Delta \alpha = \frac{\Delta A_G}{A} \qquad \text{Eq. (4a)}$$

This local instantaneous fluctuation of the area occupied by the gas bubbles, $\Delta A_G$, produces instantaneous fluctuations of the gas void fraction $\Delta \alpha$ as per Eq. (4a), which causes instantaneous fluctuations of the mixture density $\Delta \rho_m$ as per Eq. (3a) that in turn produces pressure fluctuations $\Delta P$ as per Eq. (1), recorded by the controller (12, 212) as voltage fluctuations as per Eq. (2). Measuring the instantaneous fluctuations of the pressure for a time period will yield statistically significant voltage instances to eventually determine an average gas void fraction $\alpha$ and mixture velocity $U_m$. The causality chain can be represented by the sequence $\Delta A_G \rightarrow \Delta \alpha \rightarrow \Delta \rho_m \rightarrow \Delta P \rightarrow \Delta V$. For a stationary two-phase fluid $\Delta A_G=0$, therefore $\Delta \alpha=0$, $\Delta \rho_m=0$, $\Delta P=0$ and $\Delta V=0$ resulting in volumetric flow rates $Q_G=0$ and $Q_L=0$. For a given volumetric gas and liquid flow rates $Q_G$, $Q_L$ specific to a random component ratio $\alpha$, the causality chain is responsible for exposing monitoring devices (22a, 22b, 222a, 222b) to the percolating two phase fluid.

Applicant's U.S. Pat. Nos. 10,274,354 and 10,634,537 describe determining at least two properties of a multiphase fluid using acceleration-related pressure drop fluctuations and PDF. Data are collected by a single piezoelectric pressure sensor and two consecutive measurements are taken by altering the flow area with a movable flow diverter. However, the relationship used to determine mixture velocity and gas void fraction is prone to errors which adversely affect the results for liquid and volumetric gas flow rates.

In contrast, the present invention involves two simultaneous measurements, does not require moving parts, and uses a signal property superior to the PDF. The signal property is the root mean square (RMS) value of the time voltage signal calculated as:

$$V_{RMS} = \sqrt{\frac{\sum_{i=0}^{999} n_i \cdot V_i^2}{\sum_{i=0}^{999} n_i}} \qquad \text{Eq. (5)}$$

where i is the bin number, $n_i$ the number of voltage instances (pulse count) accumulated in bin number i, and $V_i$ the voltage associated with bin i. The upper and lower limit of $V_i$ have been set to ±0.4V and the number of bins to 1000. Adjacent bins differ by 0.0008V (0.8 mV). Two $V_{RMS}$ values are calculated, one for each monitoring device (22a, 22b, 222a, 222b) collecting voltage samples corresponding to the distinct metering sections (28, 34, 228, 234).

Figure 7:
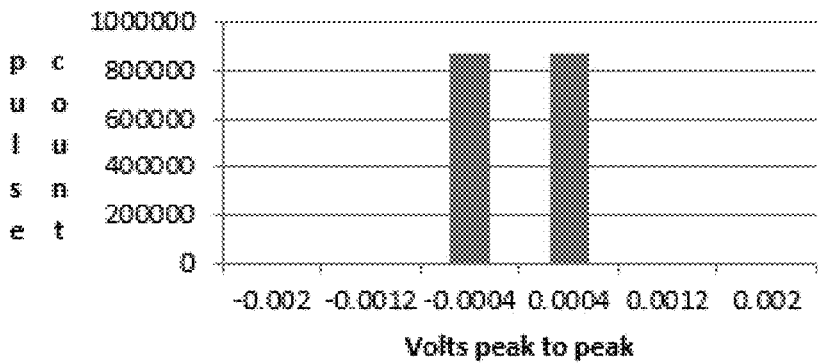
FIG. 7 is a histogram representing a fingerprint for a stationary or flowing single phase fluid, or a stationary multiphase fluid.

When there is a single-phase fluid flowing through the apparatus (10, 200), i.e., the gas void fraction is either 0 for only liquid phase or 1 for only gas phase, there is no density variation to account for local pressure variations. Because $\Delta \alpha=0$, it follows that $\Delta \rho_m=0$, $\Delta P=0$ and $\Delta V=0$. The monitoring device (22a, 22b, 222a, 222b) cannot distinguish between a stationary two phase fluid and a single phase flowing fluid. Under the flowing single phase or the two phase stationary scenario, the samples recorded by the monitoring devices (22a, 22b, 222a, 222b) are zero amplitude signals that are stored in bins closest to zero amplitude. As a zero amplitude bin does not exist when there is an even number of bins, half of the samples are stored in bin −0.0004 V and half in bin +0.0004V (FIG. 7). This corresponds to a rms voltage that represents the noise floor below which the sensor will not measure anything meaningful.

FIG. 7 is the fingerprint of a single phase flow or stationary two phase mixture or single phase, when using an even number of bins. The example is for a total of n=1,750,000 voltage instances which leads to a corresponding voltage $V_{RMS}$=0.0004 V or $V_{RMS}$=0.4 mV as per Eq. (5). It can be argued that the theoretical noise level could be reduced to zero volts by adopting an odd number of bins as this will create a storage bin allocated to voltage amplitudes equal to zero. However, any practical implementation of an odd number of bins may or may not reduce the noise floor level, depending on the sensitivity of the controller. Any noise voltage whose amplitude differs slightly from zero will be deposited in the bins adjacent to zero (this time ~±0.0008 V for say 999 bins), thus yielding a combined rms voltage larger than 0.4 mV. Paradoxically, an attempt to reduce noise floor level by using an odd number of storage bins may have the opposite effect. To reduce the noise floor level below 0.4 mV, less than 25% of the total pulse count should be in either side bin and more than 50% of the total pulse count should land in the central bin allocated to amplitude $V_{pp}$=0 V, which under practical implementations may be difficult to attain. To summarize for an odd number of bins, a signal slightly different from zero will be deposited in the adjacent bins ~±0.0008 V, thus producing a larger noise level.

In U.S. Pat. Nos. 10,274,354 and 10,634,537, the relationship PDF=f($U_m$, α) used in determining $U_m$ and α is prone to large errors that propagate to the result $Q_L$, $Q_G$. The present invention provides an improved way of determining $U_m$ and α which are used to calculate volumetric liquid flow rates $Q_L$ and gas flow rates $Q_G$ of a multiphase flow. The invention is based on a different apparatus, method, and property of the acquired signal, described as $V_{RMS}$=f($U_m$, α). An advantage of using the $V_{RMS}$ signal property is shown in FIGS. 8A-B where $U_m$ is normalized to a maximum velocity of 4.4 m/sec.

Figure 8A:
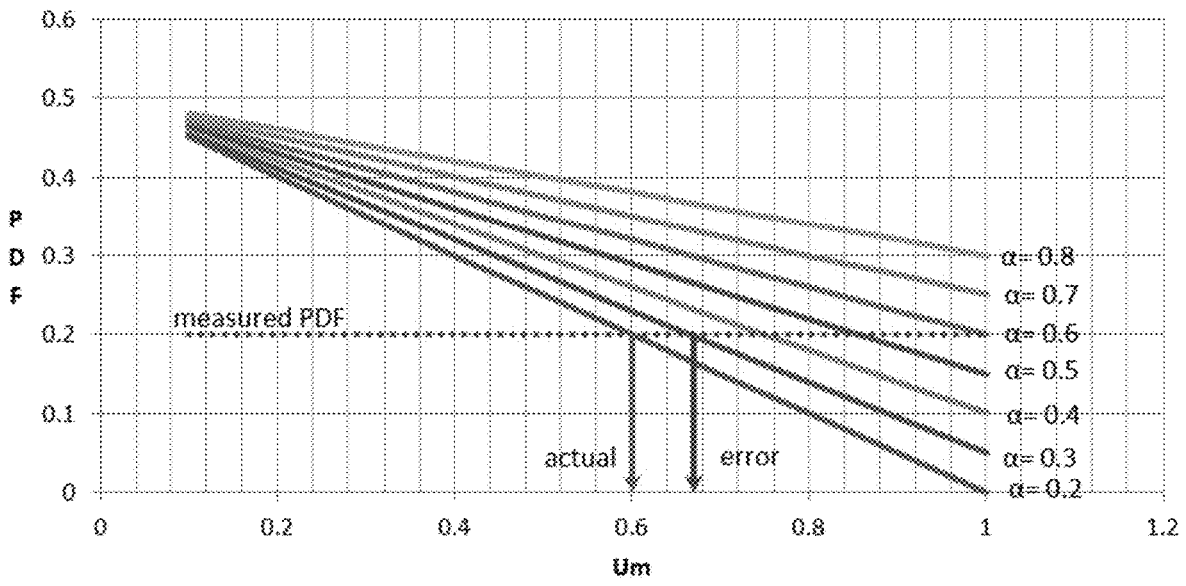
FIG. 8A is a collection of graphs used in U.S. Pat. Nos. 10,274,354 and 10,634,537, and extracted from the sensor feature maps in which the measured PDF signal modifications are shown as being related to the normalized mixture velocity $U_m$ and gas void fraction $\alpha$.

FIG. 8A relates to U.S. Pat. Nos. 10,274,354 and 10,634,537. The PDF family of curves shows the general trend obtained experimentally as monotonically decreasing with increasing $U_m$, where α=0.2 has the smallest slope. If an error in determining α is such that it increases α, then the error in determining $U_m$ is such that it will also increase $U_m$. Conversely, if an error in determining α is such that it decreases α, then the error in determining $U_m$ is such that it will also decrease $U_m$. This means the error affecting the product $U_m$·α is much larger than the individual errors affecting $U_m$ and α because errors of both variables increase or decrease simultaneously.

Figure 8B:
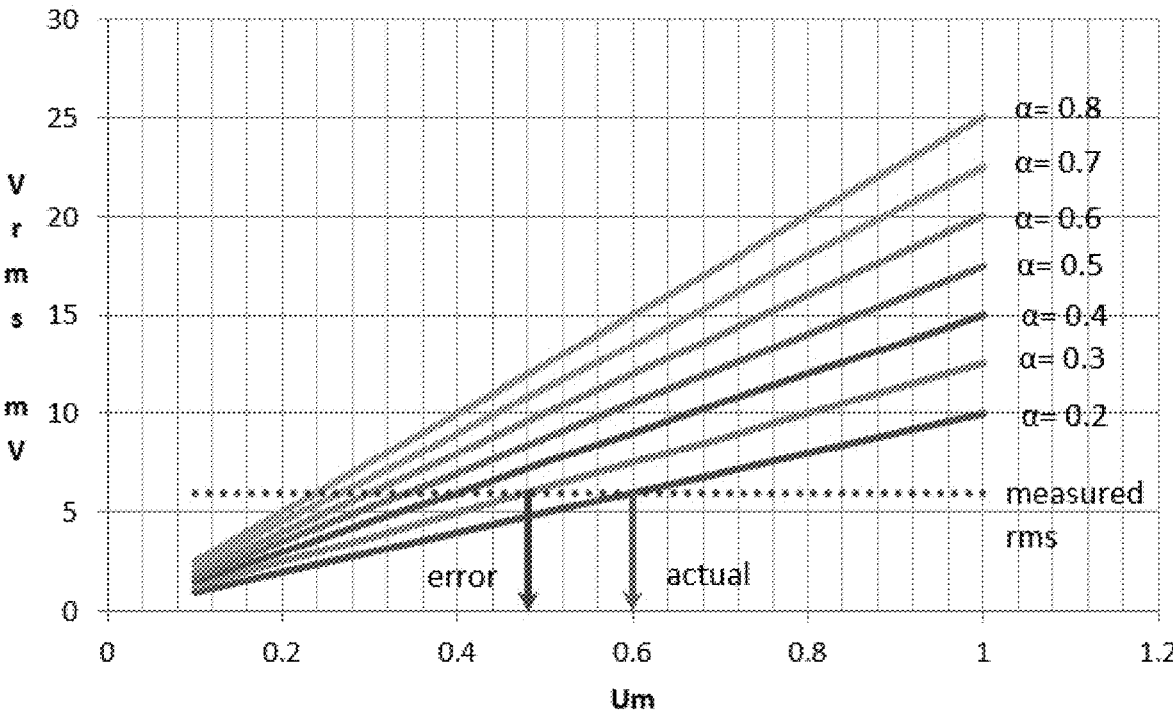
FIG. 8B is a collection of graphs for use with the invention, and extracted from sensor feature maps in which metered $V_{RMS}$ signal modifications are shown as being related to the normalized mixture velocity $U_m$ and gas void fraction $\alpha$.

In contrast, FIG. 8B relates to the present invention. The $V_{RMS}$ family of curves shows the general trend obtained experimentally as monotonically increasing with increasing $U_m$, where α=0.2 has the smallest slope. To demonstrate the self-correcting mechanism, the curves obtained for only one of the two piezoelectric sensors (22a, 22b, 222a, 222b) are shown. If an error in determining α is such that it increases α, then the error in determining $U_m$ is such that it will decrease $U_m$. Conversely, an error in determining α that decreases α will increase $U_m$. This means that the error affecting the product $U_m$·α is smaller than the individual errors affecting $U_m$ and α because errors of both variables increase or decrease in opposition, such that when one error increases the other one decreases. The error propagated to the result $Q_L$, $Q_G$ is greatly reduced.

As an example, consider a multiphase flow where α=0.2, $U_m$=0.6 and measured PDF=0.2 (as illustrated in FIG. 8A by the measured PDF=0.2 line intercepting α=0.2 line and the vertical arrow labeled 'actual' indicating $U_m$=0.6). Assume the second measurement is such that solving the equations produces an error and determines α=0.3 instead of 0.2. At the intersection of the measured PDF=0.2 line with α=0.3 line, a vertical line is drawn to find $U_m$=0.67 as indicated by the arrow labeled 'error'. The error propagated to the product $U_m$·α is 0.3·0.67/0.2·0.6−1=67.5%.

In contrast, the same multiphase flow where α=0.2 and $U_m$=0.6 and measured $V_{RMS}$=6 mV (as shown in FIG. 8B by the measured $V_{RMS}$=6 mV line intercepting α=0.2 line and the vertical arrow labeled 'actual' indicating $U_m$=0.6). Assume the second measurement is such that solving the equations produces an error and determines α=0.3 instead of 0.2. At the intersection of the measured $V_{RMS}$=6 mV line with α=0.3 line, a vertical line is drawn to find $U_m$=0.48 as indicated by the arrow labeled 'error'. The error propagated to the product $U_m$ α is 0.3·0.48/0.2·0.6−1=20%.

This example shows more than a threefold reduction of errors in calculating the $U_m$·α product when employing the $V_{RMS}$ method over the PDF method. The graphs in FIGS. 8A-B do not necessarily reflect with great fidelity the experimentally obtained relationships PDF=f($U_m$, α) and $V_{RMS}$=f($U_m$, α) but follow the general arrangement of the curves. Neither are the calculated errors in this example an allusion to actual accuracy of the apparatus and method. The numbers have been arbitrarily selected to illustrate the self-correcting mechanism that leads to improved accuracy in determining mechanical quantities. The importance of errors affecting the $U_m$·α product becomes apparent when the volumetric gas and liquid flow rates are considered, as both volumetric flow rates are directly proportional to this product under the homogeneous model, i.e.:

$$Q_G = U_m \cdot \alpha \cdot A \qquad \text{Eq. (6)}$$

$$Q_L = U_m \cdot (1 - \alpha) \cdot A \qquad \text{Eq. (6a)}$$

where A is the known metering flow area and the mixture velocity $U_m$ is defined as:

$$U_m = \frac{Q_G + Q_L}{A} = \frac{Q_m}{A} \qquad \text{Eq. (7)}$$

$$Q_m = Q_G + Q_L \qquad \text{Eq. (7a)}$$

where $Q_m$ is the mixture flow rate which is defined as the sum of the individual phases flow rates and α the gas void fraction as defined by Eq. (4).

The algorithm that allows the calculation of the gas and liquid flow rates relies on the homogeneous model where the gas volumetric flow fraction λ defined as:

$$\lambda = \frac{Q_G}{Q_G + Q_L} \qquad \text{Eq. (8)}$$

equals the homogeneous gas void fraction $\alpha$ under the assumption of no slippage between the two phases, i.e. $\alpha=\lambda$.

Operation

FIG. 9 illustrates a flow diagram of an example of a method of determining at least two properties of a flowing multiphase fluid according to the principles of the disclosure. The multiphase fluid is directed from the transport line (not shown) into the entrance (18, 218) and flows through the static mixer (18, 218) which mixes the multiphase fluid into a homogenous mixture. The homogenous mixture is then discharged from the static mixer (18, 218) and flows through the one or more venturi elements (20, 220a, 220b). The monitoring devices (22a, 222a, 22b, 222b) detect one or more properties of the homogenous mixture as it flows through the first and second metering sections (28, 34, 228, 234), and transmit corresponding signals to the controller (12, 212).

The monitoring devices (22a, 222a, 22b, 222b) comprise piezoelectric pressure sensors which detect pressure oscillations caused by the homogenous mixture flowing through the first and second metering sections (28, 34, 228, 234). Due to the factory calibration, the monitoring devices (22a, 22b, 222a, 222b) exhibit identical sensitivity and provide an identical response upon exposure to homogenous mixtures having the same gas void fraction $\alpha$ while traveling with the same mixture velocity $U_m$. The monitoring devices (22a, 22b, 222a, 222b) simultaneously pick up time-varying signals and transmit the signals to the controller (12, 212).

Computer-implemented method (900) starts at block (901), at which the controller (12, 212) powers up and generates a command through the OR block (902) to activate the data acquisition module (903). Time-varying signals detected by the monitoring devices (22a, 22b, 222a, 222b) are sampled at a predetermined rate for a predetermined time to collect sufficient data. In some embodiments, the time-varying signals are voltage signals. In some embodiments, the data acquisition module (903) may use the calibration curve to apply any correction necessary to equalize the response of the monitoring devices (22a, 22b, 222a, 222b). In some embodiments, the voltage signals are divided into holding bins (e.g., 1,750,000 bins). Each bin represents a different interval value for the amplitude of a voltage signal group, and contains a number of voltage signals collected for the voltage interval. The data acquisition module (903) measures the peak-to-peak amplitude of each voltage signal and deposits each signal in a bin corresponding to the amplitude of the signal, thus digitizing the voltage signals into a histogram. The histogram displays the number of bins, with each bin containing the number of times the voltage sample had the amplitude associated with that bin. When the total number of samples distributed in their respective bins reaches the desired number (e.g., 1,750,000 bins), the acquisition of data stops. The acquired data are stored in the data storage unit (904).

The data processing unit (905) assembles and transmits the histograms to a decision block (906) which tests the histograms for a single phase fingerprint (see for example, FIG. 7), and distinguishes between a stationary two-phase fluid and a single phase flowing fluid by inspecting the differential pressure transducer ("DPT") (912) reading. If the histogram resembles the data distribution of a single phase fingerprint and the DPT (912) registers flow, the algorithm defaults to the single phase metering module (915) which calculates the single phase flow rate using known pressure-volume-temperature ("PVT") methods and equations.

In some embodiments, the apparatus (10, 200) may include transducers appropriate for detecting single phase flow. Such transducers may include static pressure transducers ("PT", 911), differential pressure transducers ("DPT", 912), and temperature transducers ("TT", 913). The metering values from the transducers are transmitted to the analog input data acquisition module (914) and transferred to a conventional, single-phase metering algorithm executed in the single phase metering module (915). The analog input data acquisition module (914) executes continuously once the controller (12, 212) is powered on and the rate of the analog input data acquisition proceeds as fast as the controller (12, 212) scan time. The acquired metering values from the transducers (911, 913) are also used to convert $Q_L$ and $Q_G$ volumetric flow rates to standard conditions.

In the alternative, if the fluid contains both liquid and gas and the histogram resembles a data distribution of a multiphase fluid (e.g., FIGS. 6A-B), the algorithm calculates $V_{RMS1}$ and $V_{RMS2}$ (907) as per Eq. (5) which are used as inputs to Eqs. (26) and (27) derived from sensor feature maps and with the addition of Eq. 9(c) are used to solve for mixture velocity $U_m$ (m/s) and gas concentration expressed as gas void fraction $\alpha$ ($m^2/m^2$) (908):

$$V_{RMS1} = f_1(U_{m1}, \alpha) \qquad \text{Eq. (26)}$$

$$V_{RMS2} = f_2(U_{m2}, \alpha) \qquad \text{Eq. (27)}$$

$$U_{m1} \cdot A_1 = U_{m2} \cdot A_2 \qquad \text{Eq. (9c)}$$

These values are validated by comparison with the sensor feature maps. The sensor feature maps represent each signal as a function of at least two properties of the flowing multiphase fluid which are to be determined. Based upon the comparison the Solve for $U_m$ and $\alpha$ task (908) generates the first two Eqs. (26) and (27) for all known a from 0.2 to 0.8 in 0.01 increments.

The sensor feature maps were obtained using two piezoelectric sensors of known response property that were exposed to a systematic matrix of gas-liquid flows of various gas void fractions $\alpha$ and broad ranges of gas-liquid mixture velocities $U_m$. It was found that the repeatability of calculated $V_{RMS}$ for the same two-phase fluid, i.e., same gas void fraction at the same mixture velocity, is better than 0.1%. Data collected were subsequently organized in a family of curves of the format $$V_{RMS} = C_{00}(\alpha) + C_{01}(\alpha) \cdot U_m + C_{02} \cdot U_m^2$$

for every a from 0.2 to 0.8 in 0.01 increments which curves are stored in the Solve for $U_m$ and $\alpha$ task (908). Eq. (9c) is the constant mixture flow rate $Q_m$ property which can be applied to the metering sections and represents the conservation of total mass flux along the channel. In other words:

$$\rho_m \cdot Q_{m1} = \rho_m \cdot Q_{m2} \text{ or} \qquad \text{Eq. (9a)}$$

$$Q_{m1} = Q_{m2} \text{ or} \qquad \text{Eq. (9b)}$$

$$U_{m1} \cdot A_1 = U_{m2} \cdot A_2 \qquad \text{Eq. (9c)}$$

US 12,663,302 B2

17

Once determined, $U_m$ and $\alpha$ are used to quantify volumetric gas and liquid flow rates of the multiphase fluid at Solve for $Q_G$, $Q_L$ task (909) using Eqs. (6) and (6a), displays the results on a graphical user interface (910), and checks whether the algorithm repeats or stops (916). After the first set of $Q_G$ and $Q_L$ solutions is obtained and the power is still on, a new set of monitoring device data is being recorded and the measurement cycle repeats through the OR selector (902). Example 2 explains how the gas and liquid volumetric flow rates are obtained by solving the equations.

The following Examples are set forth to aid in the understanding of the invention, and should not be construed to limit in any way the scope of the invention as defined in the claims which follow thereafter.

Example 1—Non-Recoverable Pressure Drop ("NRPD") Calculation

The NRPD was compared for the embodiments of FIGS. 3-4. As a baseline, the formulas of Crane Laboratories (Technical Paper No. 410M, pages 2-7 and 2-11) were used to calculate the NRPD for single phase flows. The simplest approach to calculate and predict more complex two-phase pressure drop is the homogeneous flow model which treats the two-phase flow as if it were all liquid except flowing at the two-phase mixture velocity $U_m$. The two-phase pressure drop is the sum of static pressure drop caused by elevation head, momentum pressure drop caused by fluid acceleration (velocity head) and frictional pressure drop (head loss) which is the NRPD:

$$\Delta P = \Delta P_{static} + \Delta P_{momentum} + \Delta P_{friction} \qquad \text{Eq. (10)}$$

where the static pressure drop due to elevation head is:

$$\Delta P_{static} = \rho_m \cdot g \cdot L_{c,e} \qquad \text{Eq. (11)}$$

and momentum pressure drop due to velocity head is:

$$\Delta P_{momentum} = \rho_m \cdot \frac{U_m^2}{2} \qquad \text{Eq. (12)}$$

The head loss caused by fluid flow can be characterized by a dimensionless hydraulic resistance coefficient K (see Crane) which covers changes in direction of flow path, obstructions in the flow path, sudden or gradual changes in the cross-section and shape of the flow path, friction which is a function of the surface roughness of the interior surfaces, friction between phases, the inside diameter, fluid velocity, density, and viscosity. As the velocity head (meters) is:

$$h = \frac{U_m^2}{2 \cdot g} \qquad \text{Eq. (13)}$$

the head loss caused by friction encountered by a moving fluid is:

$$h_L = K \cdot \frac{U_m^2}{2 \cdot g} \qquad \text{Eq. (14)}$$

18 which translates to pressure loss as:

$$\Delta P_{friction} = \rho_m \cdot g \cdot h_L \qquad \text{Eq. (15)}$$

where $g = 9.81$ m/s$^2$ is acceleration due to gravity in Eqs. (11), (13)-(15), $L_{c,e}$ is the length in meters of the venturi section (contraction or expansion) investigated, $\rho_m$ is the mixture density in Kg/m$^3$ and $U_m$ the mixture velocity in m/s. Using Eq. (14), the NRPD given by Eq. (15) is defined as:

$$\Delta P_{friction}(\text{Pa}) = K \cdot \rho_m \cdot \frac{U_m^2}{2} \qquad \text{Eq. (16)}$$

As shown in FIGS. 3-4, the venturi elements provide gradual contractions and gradual expansions arranged in a series configuration. The empirical hydraulic resistance coefficient K due to gradual contraction (see Crane) in terms of the larger diameter, is defined as:

$$K_c = \frac{0.8 \cdot (1 - \beta^2)}{\beta^4} \cdot \sin\left(\frac{\theta}{2}\right) \qquad \text{Eq. (17)}$$

and empirical hydraulic resistance coefficient K due to gradual expansion (see Crane) in terms of the larger diameter, is defined as:

$$K_e = \frac{2.6 \cdot (1 - \beta^2)^2}{\beta^4} \cdot \sin\left(\frac{\theta}{2}\right) \qquad \text{Eq. (18)}$$

where $\beta$ is the ratio of small to large diameter, i.e., throat diameter to either upstream or downstream diameter defined as:

$$\beta = \frac{d_{min}}{d_{max}} \qquad \text{Eq. (19)}$$

and $\theta$ is the angle of convergence/divergence, in degrees, in contractions/expansions in pipes defined as:

$$\left(\frac{\theta}{2}\right) = \arctan\left(\frac{d_{max} - d_{min}}{2 \cdot L_{c,e}}\right) \qquad \text{Eq. (20)}$$

FIG. 5 shows geometrical details of the contraction/expansion model to calculate the NRPD. Although the convergence and divergence angles and lengths can differ, they have been chosen to be the same. The total NRPD is the sum of the NRPD due to contraction and expansion defined as:

$$\Delta P_{total}(\text{Pa}) = K_c \cdot \rho_m \cdot \frac{U_m^2}{2} + K_e \cdot \rho_m \cdot \frac{U_m^2}{2} \qquad \text{Eq. (21)}$$

During factory calibration, a calibration curve was generated to even out the response of the monitoring devices, and is used by the data acquisition module (903) to apply any correction necessary to equalize the response of the monitoring devices.

Table 1 summarizes geometrical key elements and calculated variables to arrive at the NRPD for the embodiments shown in FIGS. 3-4. For the embodiment in FIG. 3, two versions of the venturi geometry (39 mm or 30 mm throat) are presented to illustrate the impact a modified geometry has on the NRPD. Different geometrical dimensions of embodiments may be employed in practical industrial applications where sizing the multiphase meter to fit customer flow requirements will not introduce objectionable NRPD. All configurations indicate negligible NRPD of 0.007-0.47 KPa (0.001-0.07 psi). Such low NRPD indicates that the composition of the multiphase fluid at the entrance and inlet gas-liquid total flow rate are not changed by the apparatus due to degassing.

All calculated variables are shown with their respective units along with the equations used to derive them. Fields like $Q_L$, $Q_G$, $L_C$, $L_E$, $d_{min}$, $d_{max}$ showing no equations are known quantities used to derive the other variables. The contraction and expansion NRPD for the embodiment in FIG. 4 is the sum of the individual $\Delta Pc$ and $\Delta Pe$ values. The pressure was converted from metric to imperial units (last column).

where $C_{x00}(\alpha)$, $C_{x01}(\alpha)$ and $C_{x02}(\alpha)$ are known coefficients from the reference operational characteristics and are unique to each gas void fraction value $\alpha$ from 0.2 to 0.8, and x=1 or 2 relevant to each of the sensors. Sixty-one pairs of sets of coefficients ($C_{x00}(\alpha)$, $C_{x01}(\alpha)$, $C_{x02}(\alpha)$), for each $\alpha$ from 0.2 to 08 in 0.01 increments, are sufficient to provide an acceptable measurement resolution. Examples of actual operational characteristics related to the embodiment shown in FIG. 4 are provided in FIGS. 10A-B for void fractions $\alpha$=0.3 and $\alpha$=0.4. The graphs show the raw experimental values and the polynomial approximations in accordance with Eq (22) that best describe the observed data. As shown on the graphs, the actual values for the coefficients $C_{x00}(\alpha)$, $C_{x01}(\alpha)$, $C_{x02}(\alpha)$ that produce the displayed coefficient of determination $R^2$ are as follows:

$C_{100}(\alpha=0.3)=0.001$;   $C_{101}(\alpha=0.3)=0.0258$;   $C_{102}$ $(\alpha=0.3)=0.0497$ $C_{200}(\alpha=0.3)=0.0004$;   $C_{201}(\alpha=0.3)=0.0123$;   $C_{202}$ $(\alpha=0.3)=0.0034$ $C_{100}(\alpha=0.4)=-0.0008$;   $C_{101}(\alpha=0.4)=0.0775$;   $C_{102}$ $(\alpha=0.4)=-0.1781$

TABLE 1

| | Parameter | | | | | | | | | |
|---|---|---|---|---|---|---|---|---|---|---|
| | $Q_L$ | $Q_G$ | Um1 | Um2 | $\alpha$ | $\rho_m$ | Lc | Le | dmin | dmax |
| | | | | | | Equation | | | | |
| | | | 7 | 7 | 8 | 3 | | | | |
| | | | | | | Units | | | | |
| | CMH | CMH | m/s | m/s | — | Kg/m³ | mm | mm | mm | mm |
| Venturi 1, FIG. 3, 39 mm throat | 1.7 | 0.425 | 0.27 | 0.50 | 0.20 | 798.87 | 87.63 | 87.63 | 38.90 | 52.50 |
| Venturi 1, FIG. 3, 39 mm throat | 3 | 12 | 1.92 | 3.51 | 0.80 | 200.78 | 87.63 | 87.63 | 38.90 | 52.50 |
| Venturi 2, FIG. 3, 30 mm throat | 1.7 | 0.425 | 0.27 | 0.84 | 0.20 | 798.87 | 128.65 | 128.65 | 30.00 | 52.50 |
| Venturi 2, FIG. 3, 30 mm throat | 3 | 8.2 | 1.44 | 4.40 | 0.73 | 268.42 | 128.65 | 128.65 | 30.00 | 52.50 |
| Venturi 1 + Venturi 2, FIG. 4 | 1.7 | 0.425 | 0.50 | 0.84 | 0.20 | 798.87 | | | 30.00 | 38.90 |
| Venturi 1 + Venturi 2, FIG. 4 | 3 | 8.2 | 2.62 | 4.40 | 0.73 | 268.42 | | | 30.00 | 38.90 |

| | Parameter | | | | | | | |
|---|---|---|---|---|---|---|---|---|
| | $\beta$ | $\theta/2$ | Kc | Ke | $\Delta Pc$ | $\Delta Pe$ | $\Delta tot$ | $\Delta tot$ |
| | | | | | Equation | | | |
| | 19 | 20 | 17 | 18 | 16 | 16 | 21 | |
| | | | | | Units | | | |
| | — | degrees | — | — | Pa | Pa | Pa | psi |
| Venturi 1, FIG. 3, 39 mm throat | 0.74 | 4.44 | 0.09 | 0.14 | 2.75 | 4.03 | 6.78 | 0.001 |
| Venturi 1, FIG. 3, 39 mm throat | 0.74 | 4.44 | 0.09 | 0.14 | 34.44 | 50.48 | 84.92 | 0.012 |
| Venturi 2, FIG. 3, 30 mm throat | 0.57 | 5.00 | 0.44 | 0.96 | 13.07 | 28.61 | 41.69 | 0.006 |
| Venturi 2, FIG. 3, 30 mm throat | 0.57 | 5.00 | 0.44 | 0.96 | 122.02 | 267.08 | 389.10 | 0.06 |
| Venturi 1 + Venturi 2, FIG. 4 | 0.77 | | | | 15.82 | 32.65 | 48.47 | 0.007 |
| Venturi 1 + Venturi 2, FIG. 4 | 0.77 | | | | 156.47 | 317.56 | 474.03 | 0.07 |

Example 2—Solving the Equations

The sensor reference operational characteristics graphed in FIG. 8B (i.e., sensor feature maps) are a family of parametric curves of the format $V_{RMS}$=f ($U_m$, $\alpha$) derived from an extensive database compiled from rigorous measurements under the following conditions: 1.7CMH$\leq Q_L \leq$3 CMH, 0.425 CMH$\leq Q_G \leq$12 CMH, 0.2$\leq \alpha \leq$0.8, 0<$U_m$<1, where $U_m$ is the mixture velocity normalized to 4.4 m/s. Consistent with Eqs. (1) and (2), they are defined as:

$$V_{RMSx} = C_{x00}(\alpha) + C_{x01}(\alpha) \cdot U_{mx} + C_{x02}(\alpha) \cdot U_{mx}^2 \qquad \text{Eq. (22)}$$

$C_{200}(\alpha=0.4)=-0.0039$;   $C_{201}(\alpha=0.4)=0.0441$;   $C_{202}$ $(\alpha=0.2)=-0.0438$ Each of the two trends in FIGS. 10A-B corresponds to signals received by the piezoelectric sensors. One trend corresponds to lower velocities, the other to higher velocities. The trend associated with the larger flowing area corresponds to lower velocities whereas the trend associated with the smaller flowing area corresponds to higher velocities.

One measurement cycle obtains two rms voltage values $V_{RMS1}$ and $V_{RMS2}$ which according to Eq. (22) determines a pair of $U_m$ values, $U_{m1}$ and $U_{m2}$, resulting from solving the following quadratic equations for each of the 61 sets of coefficients:

$$0 = C_{100}(\alpha) - V_{RMS1} + C_{101}(\alpha) \cdot U_{m1} + C_{102}(\alpha) \cdot U_{m1}^2 \qquad \text{Eq. (23)}$$

$$0 = C_{200}(\alpha) - V_{RMS2} + C_{201}(\alpha) \cdot U_{m2} + C_{202}(\alpha) \cdot U_{m2}^2 \qquad \text{Eq. (24)}$$

Only real positive values between 0 and 1 are accepted as valid solutions of Eqs. (23) and (24) as $U_m$ has been normalized to a maximum velocity of 4.4 m/s. Sixty-one sets of $(U_{m1}, U_{m2})$ pairs are thus obtained, one for each value of $\alpha$ in the interval 0.2 to 0.8 in 0.01 increments, and the pair that best satisfies Eq. (9c) below:

$$U_{m1} \cdot A_1 = U_{m2} \cdot A_2 \qquad \text{Eq. (9c)}$$

with the least amount of error being the one that provides the expected solution for $U_m$ and $\alpha$. In other words, it is a matter of evaluating the implicit equation:

$$U_{m1} \cdot A_1 - U_{m2} \cdot A_2 = 0 \qquad \text{Eq. (25)}$$

for each of the 61 $(U_{m1}, U_{m2})$ pairs and selecting the pair that gets the expression closest to zero. The $\alpha$ corresponding to that pair is the sought after solution. Once $U_m$ and $\alpha$ are known, volumetric flow rates $Q_L$ and $Q_G$ can be computed as per Eqs. (6) and (6a). If it is desired to expand the range of the gas void fraction $\alpha$ from 0.2-0.8 to 0.05-0.95, one would obtain 91 pairs $(U_{m1}, U_{m2})$ to evaluate Eq. (25).

Although various embodiments and methodologies have been shown and described, the invention is not limited to such embodiments and methodologies and will be understood to include all modifications and variations as would be apparent to one skilled in the art. It should be understood that the invention is not intended to be limited to the particular forms disclosed. Rather, the intention is to cover all modifications, equivalents and alternatives falling within the scope of the invention as defined by the appended claims.

What is claimed is:

1. A method for determining at least two properties of a flowing multiphase fluid comprising the steps of:
   a) directing the multiphase fluid through an apparatus comprising:
      (i) an I-shaped body comprising an entrance for directing the multiphase fluid, and an exit for discharging the multiphase fluid therefrom;
      (ii) a static mixer positioned downstream of the entrance for mixing the multiphase fluid to yield a homogenous mixture;
      iii) one or more venturi elements positioned downstream of the static mixer for receiving the homogenous mixture, and comprising first and second metering sections having different areas $A_1$ and $A_2$;
   b) monitoring the multiphase fluid with at least two monitoring devices in communication with the first and second metering sections to obtain at least two simultaneous signals representing at least two properties of the multiphase fluid;
   c) converting the at least two signals into root mean square voltage values and comparing the root mean square voltage values with sensor feature maps having a format:

$$V_{RMS} = f(U_m, \alpha)$$

wherein $U_m$ denotes mixture velocity and $\alpha$ denotes gas void fraction;
   d) correcting the root mean square values using a calibration curve to equalize responses of the monitoring devices;
   e) establishing an equation set for each value of gas void fraction $\alpha$ belonging to a predetermined interval as follows:

$$\text{i. } V_{RMS1} = f_1(U_{m1}, \alpha) \qquad \text{Eq. (26)}$$

$$\text{ii. } V_{RMS2} = f_2(U_{m2}, \alpha) \qquad \text{Eq. (27)}$$

$$\text{iii. } U_{m1} \cdot A_1 = U_{m2} \cdot A_2 \qquad \text{Eq. (9c)}$$

f) solving the equation set to obtain the mixture velocity and the gas void fraction;
   g) using the mixture velocity and the gas void fraction to obtain volumetric gas flow rate $Q_G$ and liquid flow rate $Q_L$ using Equations 6 and 6a as follows:

$$Q_G = U_m \cdot \alpha \cdot A \qquad \text{Eq. (6)}$$

$$Q_L = U_m \cdot (1 - \alpha) \cdot A \qquad \text{Eq. (6a)}$$

and
   h) repeating steps a) through g) to update the volumetric gas flow rate and the liquid flow rate on a continuous basis.

2. The method of claim 1, wherein the at least two monitoring devices are piezoelectric pressure sensors capable of detecting pressure oscillations representing flow of discrete phase elements of the multiphase fluid, and obtaining at least two simultaneous signals corresponding to at least two different mixture velocities.

3. The method of claim 1, wherein in step (c), the sensor feature maps comprise self-correcting algorithms.

4. The method of claim 1, wherein in step (e), Equations 26 and 27 establish a collection of pairs denoted $U_{m1}$ and $U_{m2}$, each pair corresponding to a gas void fraction $\alpha$ belonging to a predetermined interval ranging between 0 and 1 in 0.01 increments.

5. The method of claim 4, further comprising testing each pair $(U_{m1}, U_{m2})$ against Equation 9c to determine best fit and corresponding gas void fraction $\alpha$.

6. The method of claim 5, where the volumetric gas flow rate $Q_G$ and the liquid flow rate $Q_L$ are computed from mixture velocity $U_m$ and gas void fraction $\alpha$.

7. An apparatus for determining at least two properties of a multiphase fluid comprising:
   (i) an I-shaped body comprising an entrance for directing the multiphase fluid, and an exit for discharging the multiphase fluid therefrom;
   (ii) a static mixer positioned downstream of the entrance for mixing the multiphase fluid to yield a homogenous mixture;
   (iii) one or more venturi elements positioned downstream of the static mixer for receiving the homogenous mixture, and comprising first and second metering sections having different areas;

(iv) at least two monitoring devices mounted in fluid communication at the first and second metering sections for monitoring one or more properties of the homogenous mixture flowing therethrough;

wherein the apparatus is capable of being communicatively coupled to a controller for calculating the one or more properties of the multiphase fluid from at least two simultaneous signals received from the monitoring devices.

8. A system for determining at least two properties of a multiphase fluid comprising:

(a) an apparatus comprising:

(i) an I-shaped body comprising an entrance for directing the multiphase fluid, and an exit for discharging the multiphase fluid therefrom;

(ii) a static mixer positioned downstream of the entrance for mixing the multiphase fluid to yield a homogenous mixture;

(iii) one or more venturi elements positioned downstream of the static mixer for receiving the homogenous mixture, and comprising first and second metering sections having different areas;

(iv) at least two monitoring devices mounted in fluid communication at the first and second metering sections for monitoring one or more properties of the homogenous mixture flowing therethrough; and (b) a controller communicatively coupled to the monitoring devices for calculating the one or more properties of the multiphase fluid from at least two simultaneous signals received from the monitoring devices.

9. The system of claim 8, wherein an entry to the venturi element comprises the first metering section, positioned downstream of the static mixer and comprising a first area, and a converging inlet and a diverging outlet at opposite ends thereof, and the second metering section positioned between the converging inlet and the diverging outlet and comprising a second area.

10. The system of claim 9, wherein the first area of the first metering section is greater than the second area of the second metering section.

11. The system of claim 8, comprising:

a first venturi element positioned downstream of the static mixer and comprising a converging inlet and a diverging outlet at opposite ends thereof, and the first metering section positioned between the converging inlet and the diverging outlet and comprising a first area; and a second venturi element positioned downstream of the first venturi element and comprising a converging inlet and a diverging outlet at opposite ends thereof, and the second metering section positioned between the converging inlet and the diverging outlet and comprising a second area.

12. The system of claim 11, wherein the first area of the first metering section is greater than the second area of the second metering section.

13. The system of claim 8, wherein the at least two monitoring devices are piezoelectric pressure sensors capable of detecting pressure oscillations representing flow of discrete phase elements of the multiphase fluid, and obtaining at least two simultaneous signals corresponding to at least two different mixture velocities.

14. A system comprising a controller communicatively coupled to at least two monitoring devices for calculating at least two properties of a multiphase fluid from at least two simultaneous signals received from the at least two monitoring devices, the controller comprising a processor and a memory device coupled to the processor, the memory device containing a set of instructions that, when executed by the processor cause the processor to:

a) receive the signals representing at least two properties of the multiphase fluid from the monitoring devices;

b) convert the signals into root mean square voltage values and compare the root mean square voltage values with sensor feature maps having a format:

$$V_{RMS} = f(U_m, \alpha)$$

wherein $U_m$ denotes mixture velocity and $\alpha$ denotes gas void fraction;

c) correcting the root mean square values using a calibration curve to equalize responses of the monitoring devices;

d) establish an equation set for each value of gas void fraction $\alpha$ belonging to a predetermined interval as follows:

i. $V_{RMS1} = f_1(U_{m1}, \alpha)$      Eq. (26)

ii. $V_{RMS2} = f_2(U_{m2}, \alpha)$      Eq. (27)

iii. $U_{m1} \cdot A_1 = U_{m2} \cdot A_2$      Eq. (9c)

e) solve the equation set to obtain the mixture velocity and the gas void fraction;

f) use the mixture velocity and the gas void fraction to obtain volumetric gas flow rate $Q_G$ and liquid flow rate $Q_L$ using Equations 6 and 6a as follows:

$$Q_G = U_m \cdot \alpha \cdot A$$      Eq. (6)

$$Q_L = U_m \cdot (1 - \alpha) \cdot A$$      Eq. (6a)

and g) repeat steps a) through f) to update the volumetric gas flow rate and liquid flow rate on a continuous basis.

15. A non-transitory computer-readable medium storing instructions that, when executed by a processor, causes the processor to:

a) receive signals representing at least two properties of a flowing multiphase fluid from at least two monitoring devices;

b) convert the signals into root mean square voltage values and compare the root mean square voltage values with sensor feature maps having a format:

$$V_{RMS} = f(U_m, \alpha)$$

wherein $U_m$ denotes mixture velocity and a denotes gas void fraction;

c) correcting the root mean square values using a calibration curve to equalize responses of the monitoring devices;

d) establish an equation set for each value of gas void fraction $\alpha$ belonging to a predetermined interval as follows:

i. $V_{RMS1} = f_1(U_{m1}, \alpha)$     Eq. (26)

ii. $V_{RMS2} = f_2(U_{m2}, \alpha)$     Eq. (27)

iii. $U_{m1} \cdot A_1 = U_{m2} \cdot A_2$     Eq. (9c)     5 e) solve the equation set to obtain the mixture velocity and the gas void fraction;

f) use the mixture velocity and the gas void fraction to  10 obtain volumetric gas flow rate $Q_G$ and liquid flow rate $Q_l$ using Equations 6 and 6a as follows:

$$Q_G = U_m \cdot \alpha \cdot A$$     Eq. (6)     15

$$Q_L = U_m \cdot (1 - \alpha) \cdot A$$     Eq. (6a)

and g) repeat steps a) through f) to update the volumetric gas  20 flow rate and liquid flow rate on a continuous basis.

\*　\*　\*　\*　\*